(12) United States Patent
Glasgow et al.

(10) Patent No.: US 9,922,127 B2
(45) Date of Patent: *Mar. 20, 2018

(54) FOOTPRINT TRACKING OF CONTACTS

(71) Applicant: AT & T Intellectual Property I, L.P., Atlanta, GA (US)

(72) Inventors: Jay Oliver Glasgow, Acworth, GA (US); Precia Carraway, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 267 days.

This patent is subject to a terminal disclaimer.

(21) Appl. No.: 14/817,820

(22) Filed: Aug. 4, 2015

(65) Prior Publication Data

US 2015/0339398 A1    Nov. 26, 2015

Related U.S. Application Data

(63) Continuation of application No. 13/925,222, filed on Jun. 24, 2013, now Pat. No. 9,110,952, which is a continuation of application No. 12/638,463, filed on Dec. 15, 2009, now Pat. No. 8,473,472.

(51) Int. Cl.
| | |
|---|---|
| *G06F 17/30* | (2006.01) |
| *H04L 29/08* | (2006.01) |
| *G06Q 30/02* | (2012.01) |
| *H04M 3/493* | (2006.01) |
| *H04M 1/2745* | (2006.01) |

(52) U.S. Cl.
CPC .. *G06F 17/30876* (2013.01); *G06F 17/30345* (2013.01); *G06F 17/30522* (2013.01); *G06Q 30/02* (2013.01); *H04L 67/22* (2013.01); *H04M 1/274558* (2013.01); *H04M 3/4931* (2013.01); *H04M 1/274516* (2013.01)

(58) Field of Classification Search
USPC ......................................... 707/999.003, 734
See application file for complete search history.

(56) References Cited

U.S. PATENT DOCUMENTS

| | | | | |
|---|---|---|---|---|
| 7,222,222 | B1* | 5/2007 | Vartti | G06F 12/0828 711/151 |
| 2007/0129995 | A1* | 6/2007 | Brandow | G06Q 30/02 705/14.53 |
| 2009/0117921 | A1* | 5/2009 | Beydler | G01S 5/0027 455/457 |
| 2010/0299340 | A1* | 11/2010 | Murthy | G06Q 10/10 707/759 |

* cited by examiner

*Primary Examiner* — Baoquoc N To
(74) *Attorney, Agent, or Firm* — Fay Kaplun & Marcin, LLP

(57) ABSTRACT

A footprints device includes an input module and an output module. The input module receives a request for footprint data. The footprint data relates to names of users. The output module sends the footprint data to an address book. The footprint data is marked to indicate when at least one of the names of the users is a contact of the address book.

16 Claims, 3 Drawing Sheets

FOOTPRINT TRACKING OF CONTACTS

PRIORITY CLAIM/INCORPORATION BY REFERENCE

This application is a Continuation Application of pending U.S. patent application Ser. No. 13/925,222 filed on Jun. 24, 2013 entitled "Footprint Tracking Of Contacts" which is a Continuation Application of U.S. patent application Ser. No. 12/638,463, now U.S. Pat. No. 8,473,472, issued on Jun. 25, 2013, filed on Dec. 15, 2009 entitled "Footprint Tracking Of Contacts." The entire disclosure of these prior applications are considered as being part of the disclosure of the accompanying application and hereby expressly incorporated by reference herein.

BACKGROUND

A user may have access to a Yellow Pages in which information regarding business entities may be found. The user may also have an electronic address book which has access to the Yellow Pages. The user may perform a search of the business entities to find one that meets the requirements of the user. However, the user may also want a recommendation. For example, the recommendation relate to a reliability of the product, a reliability of the company, a general cost analysis of the product among companies, etc. The user may be limited to reading comments from unknown people, hearing from word of mouth, merely making a decision oneself, etc.

SUMMARY

The exemplary embodiments of the present invention describe a footprints device. The footprints device comprises an input module and an output module. The input module receives a request for footprint data. The footprint data relates to names of users. The output module sends the footprint data to an address book. The footprint data is marked to indicate when at least one of the names of the users is a contact of the address book.

DETAILED DESCRIPTION

Figure 1:
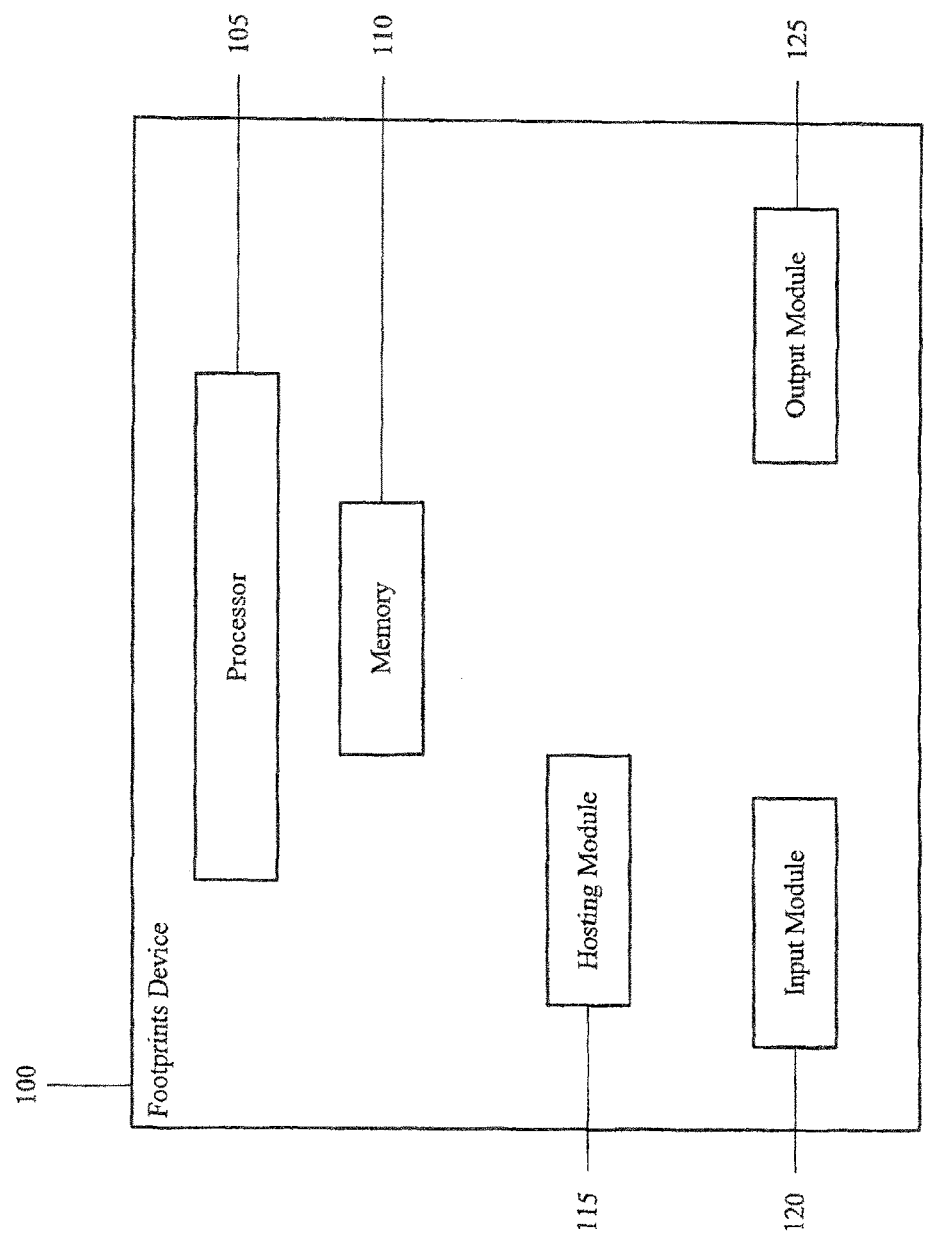
FIG. 1 shows a footprints device according to an exemplary embodiment.

The exemplary embodiments may be further understood with reference to the following description and the appended drawings, wherein like elements are referred to with the same reference numerals. The exemplary embodiments describe a footprint tracking system and method for providing footprint tracking data related to contacts of an address book. Specifically, the footprint tracking system may be configured on a server side to work in conjunction with the address book to provide the footprint tracking data. The footprint tracking system, the footprint tracking data, the address book, and related methods will be discussed in further detail below.

FIG. 1 shows a footprints device 100 according to an exemplary embodiment. The footprints device 100 may be configured to track footprints of users who visit a web page hosted at a server in which the footprints device 100 is disposed. The footprints device 100 may include a processor 105, a memory 110, a hosting module 115, an input module 120, and an output module 125.

The footprints device 100 may be embodied in a variety of configurations. In a first exemplary embodiment, the footprints device 100 may be a software program of a server, in particular a web page hosting server. In a second exemplary embodiment, the footprints device 100 may be modular and incorporated with the web page hosting server. For example, the modularity may allow the footprints device 100 to be connected to the server externally via a universal serial bus (USB) port. In another example, the modularity may allow the footprints device 100 to be connected to the server internally on a mother board of the server.

The processor 105 may control the functionalities performed by the footprints device 100. For example, as will be described below, the processor 105 may update a footprint database of users who have visited the web page hosted by the server. The memory 110 may serve as a storage unit for the footprints device 100. For example, the footprint database may be stored on the memory 100. As discussed above, the footprints device 100 may be incorporated with a server of a web page. In another exemplary embodiment, the footprints device 100 may be configured as the server of the web page itself. Thus, the hosting module 115 may be configured to host the web page. The input module 120 may receive requests from outside sources such as users of address books that are either a personalized Yellow Pages (PYP) with access to search a Yellow Pages or address books that are configured to perform a search of the Yellow Pages. Thus, the footprints device 100 may receive a request via the input module 120 for the footprint database. The output module 125 may send data to the outside sources such as the users of the address books. Thus, the footprints device 100 may forward the footprint database via the output module 120 when the request is received.

According to the exemplary embodiments, the footprints device 100 may receive a request for the web page hosted thereby via the input module 120. For example, the request may be sent from an address book that performed a search. A result of the search may include the web page hosted by the footprints device 100. The footprints device 100 may subsequently forward a current footprint database stored in the memory 110 via the output module 125 to the address book. The current footprint database may include information about users who have visited the web page and have permitted tracking thereof. The range of information relating to the users may include merely a name to a full disclosure of the user (e.g., all the information included in the address book of the user).

The address book may be configured to cross reference the current footprint database with the contacts included in the address book. Thus, if a contact in the address book is included in the current footprint database, the address book may determine with which search results the footprints are associated. The search result with associated footprints may be indicated with a marking so that the user is aware that footprints are associated therewith. The address book may further enable the user to view the users who left footprints with a particular search result. In this manner, the user may know that contacts of the address book have visited the web page and have recommended the company.

If the user of the address book selects to visit a particular web page that utilizes the footprints device 100, the footprints device 100 may request to create a footprint for the user so that subsequent users who perform the search may be aware that the user has visited the web page and recommended it. The footprints device 100 may be configured for a variety of options regarding leaving the footprint.

In one exemplary embodiment, an implicit footprint may be created. The implicit footprint may enable contacts in the user's address book to become aware that the user has visited the web page. For example, the address book user selects to use the implicit footprint. The address book user visits the web page hosted by the footprints device 100. A contact of the address book may subsequently perform a search in which the web page hosted by the footprints device 100 is a result. Since a contact has performed the search, the footprint database may note that the address book user selected the implicit footprint, thereby the footprint may be tracked by the contact. Accordingly, non-contacts will be unaware that the address book user has visited the web page/recommended it.

In a second exemplary embodiment, an explicit footprint may be created. The explicit footprint may enable anyone to become aware that the user has visited the web page. Thus, the footprint database may note that the address book user has selected the explicit footprint and always includes the address book user's footprint when the web page hosted by the footprints device 100 is a result of a search performed by both contacts and non-contacts of the address book.

In a third exemplary embodiment, an invisible footprint may be created. The invisible footprint may enable no searcher to become aware that the address book user has visited the web page. The footprint database may track that the address book user has visited the web page but prevents the address book user's footprint from being visible. It should be noted that the invisible footprint may still be used to remind the address book user that a prior visit was made the web page.

The footprint creation may also include a variety of different configurations. In a first example, the user of the address book may indicate to always create the selected footprint. In a second example, the user of the address book may indicate to never create a footprint. In a third example, the user of the address book may choose to create a footprint ad hoc for each web page visited.

Figure 2:
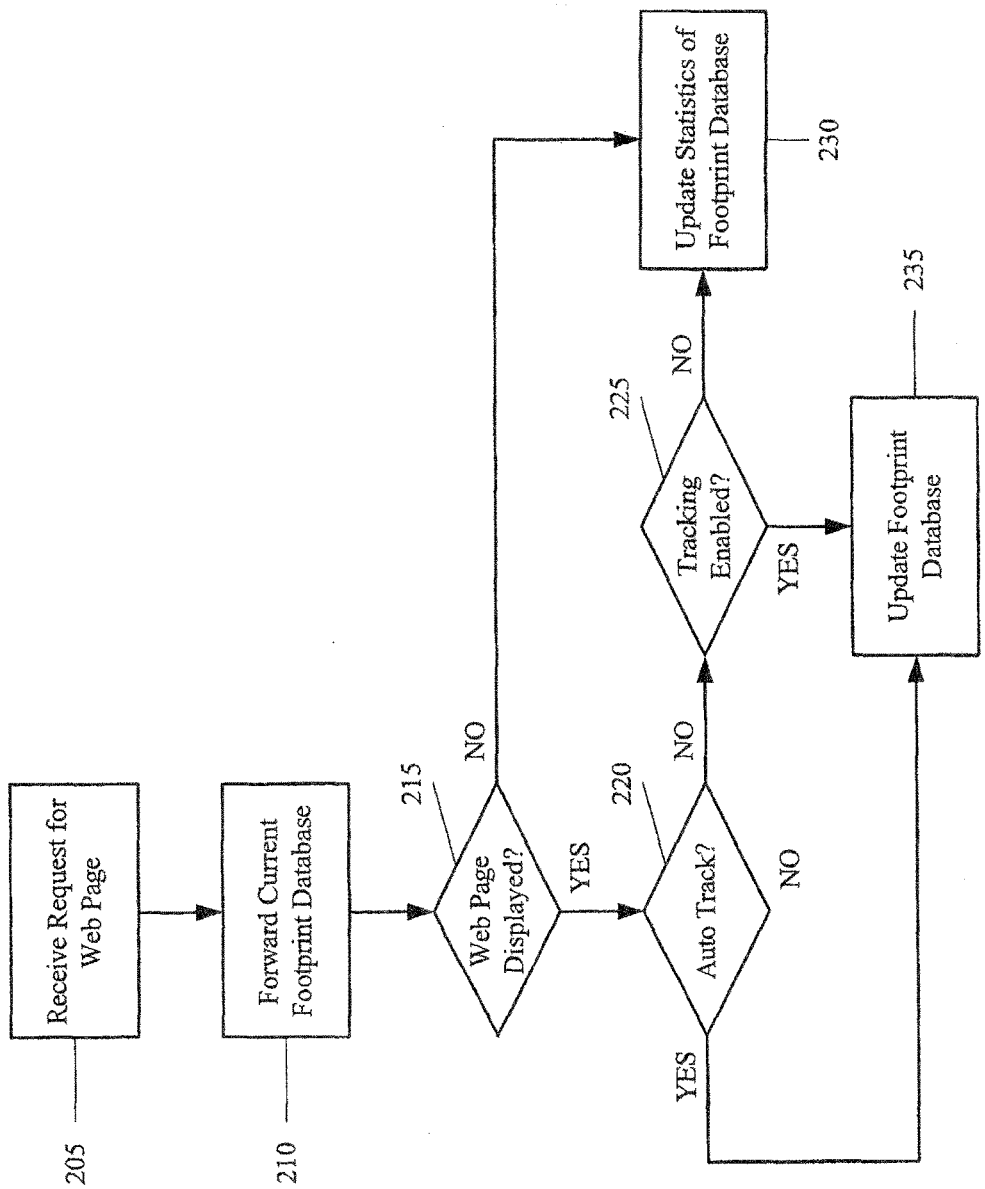
FIG. 2 shows a method for providing footprint data to an address book according to an exemplary embodiment.

FIG. 2 shows a method 200 for providing footprint data to an address book according to an exemplary embodiment. The method 200 may relate to the footprints device 100. That is, the method 200 may be from the viewpoint of the footprints device 100. The method 200 will be described with reference to the footprints device 100 of FIG. 1.

In step 205, the footprints device 100 receives via the input module 120 a request for the web page hosted thereby via the hosting module 115. The request for the web page may to send the web page to an outside source to be displayed. The request may also be to list the web page from a search performed by the outside source. In step 210, the footprints device 100 forwards the current footprint database stored in the memory 110 via the output module 125 to the requesting source.

In step 215, a determination is made by the footprints device 100 if the request was to display the web page to the outside source and not merely list the web page from a search. If the determination indicates that the web page was merely listed, then the method 200 continues to step 230 where the statistics of the footprint database is updated. The update to the statistics of the footprint database may include, for example, a counter that indicates a number of times the web page was a result from a search performed.

If the determination indicates that the web page was forwarded and/or displayed to the outside source, the method 200 continues to step 220. In step 220, the footprints device 100 determines whether auto tracking of the outside source has been enabled. As discussed above, the tracking of the footprint of the outside source may be automatically performed when the user selects that option. In this manner, the user is not required to indicate a selection each time a web page is visited.

If the determination indicates that the auto tracking of the footprint for the outside source is automatic, the method 200 continues to step 235 where the footprints device 100 updates the footprint database. The update in this case may include the statistical updates performed in step 230 (e.g., increase the counter). The update may further include noting the user of the outside source (e.g., address book). The address book may forward information relating to the user of the outside source (e.g., name, address, telephone number, etc.).

If the determination indicates that the auto tracking of the footprint of the outside source is not automatic, the method 200 continues to step 225 where a determination is made by the footprints device 100 whether footprint tracking is enabled. As discussed above, the user of the outside source may select to not have tracking enabled. If the determination indicates no tracking, the method 200 continues to step 230 where the statistics stored in the footprint database is updated. If the determination indicates that tracking is enabled, the method 200 continues to step 235 where the footprint database is updated.

It should be noted that the method 200 may include additional steps. For example, after step 220 or 225 where the determination indicates that some form of tracking is enabled, a further determination may be made by the footprints device 100 whether the enabled tracking is to create an implicit footprint, an explicit footprint, or an invisible footprint. Thus, when the type of footprint is determined, the footprints database may be updated accordingly so subsequent uses of the footprints database may indicate whether to list the user of the outside source.

Figure 3:
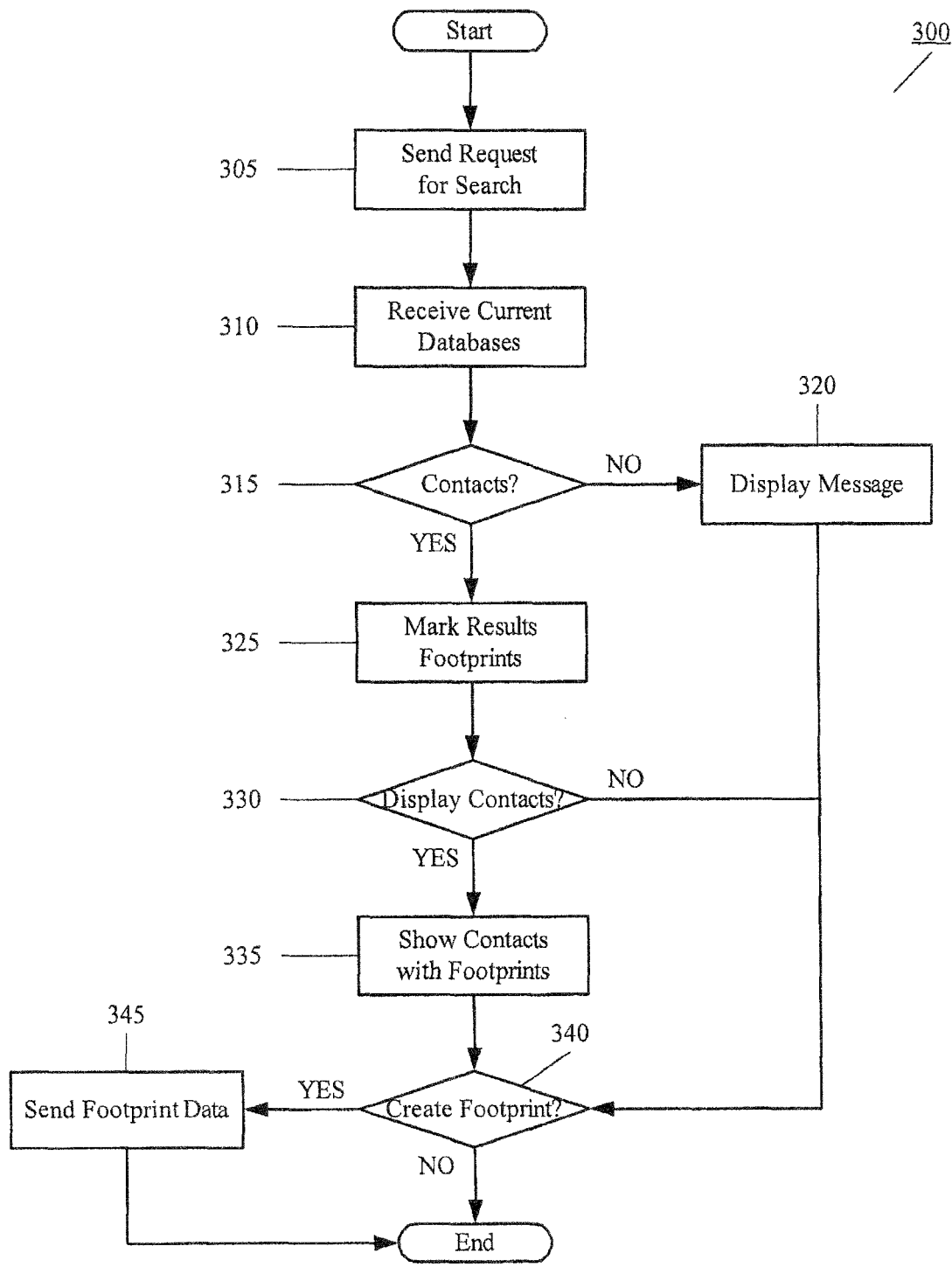
FIG. 3 shows a method for receiving footprint data at an address book according to an exemplary embodiment.

FIG. 3 shows a method 300 for receiving footprint data at an address book according to an exemplary embodiment. The method 300 may relate to the address book side in which the footprints device 100 works in conjunction. Furthermore, because the address may be configured to perform searches that may include more than one result, the address book may work in conjunction with a corresponding number of footprints devices 100. The method 300 will be described with reference to the footprints device 100 of FIG. 1.

In step 305, a user of the address book inputs a search parameter for the Yellow Pages resulting in the address book sending a request for the search. The footprints device 100 may receive the request and determine if the search parameter matches predetermined parameters. Thus, the footprints device 100 may determine if a result is to be given for the search. In another exemplary embodiment, the address book may query the different hosting modules 115 of the footprints devices 100 to determine if the web page hosted thereby should be a result.

In step 310, the footprints devices 100 which host a web page that matches the search parameter send the current footprint database via the output module 125 and is received by the address book. As discussed above, multiple current footprint databases may be received during this step according to the number of web pages are returned as a result of the search.

In step 315, the address book determines if any information included in the current footprint databases are a contact that is also included in the address book. It should be noted that this step assumes that the user of the address book has selected to only retrieve footprint tracking of people known to the user. In another exemplary embodiment, the user may select to enable all footprints to be retrieved whether a contact or not included in the address book. If no contact is included among the footprint databases, the method 300 continues to step 320 where the address book may display a message indicating no commonalities were found between the footprint databases and the address book. The message may be shown in a predetermined area of the user interface of the address book or may be shown as a pop up window.

If the determination indicates that at least one contact is included among the footprint databases, the method 300 continues to step 325 where the corresponding results may be marked to indicate that there is footprint tracking associated therewith. In step 330, a determination is made by the address book whether the contacts are to be displayed for a given search result. For example, the user may have selected an option to automatically display the contacts. The address book may subsequently list the contacts for the given search result. In another example, the user may manually select to display the contacts such as clicking on the marking. If the address book determines that the user has selected to display the contacts, the method 300 continues to step 335 where the contacts are displayed.

After step 330 or 335 where the footprint tracking is performed or after step 320 where the message is displayed, the method 300 may continue to step 340 where a determination is made by the address book to create a footprint. The determination may result after the user of the address book is forwarded to a web page of one of the results of the search. The address book may determine the type of footprint to be created (e.g., implicit, explicit, or invisible). If a footprint is to be created, the address book may package a data packet to be sent in step 345 to the appropriate footprints device 100.

The exemplary embodiments enable a tracking of footprints. A user of an address book may learn of contacts that have visited web pages that have been returned from a search that is performed by the user. In this manner, a recommendation system may be set up for the user of the address book. The user of the address book may automatically be informed of whether a particular web page is recommended to be used by known associates and may no longer be required to depend upon random recommendations.

The exemplary embodiments may be configured for various types of tracking. In a first example, a type of footprint may be selected by the user to be used for the tracking thereof. An implicit footprint may enable sharing of tracking with only contacts of the address book. An explicit footprint may enable sharing of tracking with all users. An invisible footprint may enable a tracking but does not enable other users, both contacts and non-contacts, from being able to track. In a second example, the tracking may be performed according to the user's parameters. The tracking may be done automatically so all web pages visited are tracked. The tracking may never be done so no tracking is enabled. The tracking may be done ad hoc so each web page visited prompts authentication for tracking.

Those skilled in the art will understand that the above described exemplary embodiments may be implemented in any number of manners, including as a separate software module, as a combination of hardware and software, etc. For example, the footprints device 100 may be embodied as a program containing lines of code that, when compiled, may be executed on the processor 105.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A footprints device, comprising:
a non-transitory memory that stores footprint data, the footprint data including information related to a user that performed a search, the footprint data further including a marking to indicate when the user is a contact of an address book; and
an input module that receives a command to update the footprint data to track a further user of the address book, wherein the command indicates a selection of one of an enabled tracking and a disabled tracking;
wherein the command indicates a type of footprint to be associated with the further user of the address book, wherein the type includes one of an implicit footprint, an explicit footprint, or an invisible footprint;
wherein the footprints device determines a recommendation based on the footprint data of contacts in the address book.

2. The footprints device of claim 1, wherein the footprint device is modular and incorporated with a web page hosting service.

3. The footprints device of claim 2, wherein the modularity allows the footprints device to be connected to a server externally via a universal serial bus port.

4. The footprints device of claim 1, wherein the implicit footprint enables the contact to become aware that the user has visited a web page.

5. The footprints device of claim 1, wherein the explicit footprint enables any contact or non-contact to become aware that the user has visited a web page.

6. The footprints device of claim 1, wherein the invisible footprint prevents any searcher from becoming aware that the user has visited a web page.

7. The footprints device of claims 1, wherein the memory further stores permission data, the permission data indicating whether the user permitted tracking.

8. The footprints device of claim 1, wherein the address book determines whether to create a new footprint.

9. A non-transitory computer-readable storage medium including a set of instructions executable by a processor, the set of instructions, when executed by the processor, causing the processor to perform a method comprising:
receiving a command to update the footprint data to track a user of an address book, wherein the command indicates a selection of one of an enabled tracking and a disabled tracking, wherein the footprint data includes information related to a previous user that performed a search, the footprint data further including a marking to indicate when the previous user is a contact of the address book;
receiving a command to indicate a type of footprint to be associated with the further user of the address book, wherein the type includes one of an implicit footprint, an explicit footprint, or an invisible footprint:
determining a recommendation based on the footprint data of contacts in the address book.

10. The non-transitory computer-readable storage medium of claim 9, wherein the search is for business entities.

11. The non-transitory computer-readable storage medium of claim 9, wherein the information related to the user includes a name of the user and the name of the user is displayed on the address book based on the marking in the footprint data.

12. The non-transitory computer-readable storage medium of claim 9, wherein the implicit footprint enables the contact to become aware that the user has visited a web page.

13. The non-transitory computer-readable storage medium of claim 9, wherein the explicit footprint enables any contact or non-contact to become aware that the user has visited a web page.

14. The non-transitory computer-readable storage medium of claim 9, wherein the invisible footprint prevents any searcher from becoming aware that the user has visited a web page.

15. The non-transitory computer-readable storage medium of claim 9, wherein the method further comprises:
   determining whether the user permitted tracking.

16. The non-transitory computer-readable storage medium of claim 9, wherein the method further comprises:
   determining whether to create a new footprint.

\* \* \* \* \*